(12) United States Patent
Moharrampour

(10) Patent No.: US 11,166,419 B2
(45) Date of Patent: Nov. 9, 2021

(54) SMART ROOT WATERING SYSTEM

(71) Applicant: Mahdi Moharrampour, Qazvin (IR)

(72) Inventor: Mahdi Moharrampour, Qazvin (IR)

(*) Notice: Subject to any disclaimer, the term of this patent is extended or adjusted under 35 U.S.C. 154(b) by 346 days.

(21) Appl. No.: 16/449,385

(22) Filed: Jun. 22, 2019

(65) Prior Publication Data
US 2020/0396914 A1 Dec. 24, 2020

(51) Int. Cl.
*A01G 25/16* (2006.01)
*A01G 25/06* (2006.01)
*G06N 3/02* (2006.01)
*G05B 19/042* (2006.01)
*A01G 29/00* (2006.01)

(52) U.S. Cl.
CPC .......... *A01G 25/167* (2013.01); *A01G 25/06* (2013.01); *A01G 29/00* (2013.01); *G05B 19/042* (2013.01); *G06N 3/02* (2013.01); *G05B 2219/2625* (2013.01)

(58) Field of Classification Search
CPC ...... A01G 25/167; A01G 25/06; A01G 29/00; A01G 25/165; G06N 3/02; G06N 3/08; G05B 19/042; G05B 2219/2625
See application file for complete search history.

(56) References Cited

U.S. PATENT DOCUMENTS

| | | | | |
|---|---|---|---|---|
| 5,927,603 A * | 7/1999 | McNabb | ............ | A01G 25/092 239/63 |
| 10,010,031 B1 * | 7/2018 | Liu | ............ | A01G 25/16 |
| 2014/0165713 A1 * | 6/2014 | Frey | ............ | G01N 33/24 73/64.56 |

* cited by examiner

*Primary Examiner* — Chad G Erdman

(57) ABSTRACT

A smart root watering system is disclosed. The system includes a controller, configured to control the system using artificial neural networks. The system further comprises vertical tubes, inserted into the soil proximity to the roots of trees and configured to deliver water to the roots of trees. The vertical tubes include a motion sensor, configured to detect variation in water flow and wirelessly send data to the controller, thereby indicating faults of the vertical tubes to the user via a handheld electronic device. The vertical tube further includes a mechanical valve with a floater, configured to regulate input water to the system with respect to the soil absorption. The system further comprises a sensor device, configured to detect the humidity level and send to the controller. The controller is further configured to estimate the required volume of water and open an electric valve for supplying water to the roots of trees.

20 Claims, 11 Drawing Sheets

SMART ROOT WATERING SYSTEM

BACKGROUND OF THE INVENTION

Underground root watering systems are used for watering roots of plants and trees, especially when water from the above ground does not sufficiently seep into the ground. Generally, the root watering systems and irrigation systems utilize a moisture sensor. The moisture sensor is inserted into the ground for detecting a moisture level of surrounding soil and sends data related to the moisture level to a controller. The controller is typically coupled to multiple valves/nozzles for controlling water flow. The controller processes the information received from the sensor and modifies a watering cycle for one or more valves/nozzles based upon the moisture level, e.g., when the soil reaches a predetermined moisture level, further the irrigation is stopped.

Inadequate water penetration is typically due to ground conditions, such as hard soil composite areas and paved urban areas, or climate conditions that do not produce sufficient precipitation. The climate conditions cause rapid evaporation of water in the soil. Currently, the existing root watering system uses multiple moisture sensors or hygrometer sensors for detecting moisture level in the soil. However, data from at least one hygrometer sensor is required to the controller for estimating the volume of water required for watering the roots of plants and trees, thereby controlling the existing root watering system. Further, the existing root watering system is expensive and complex in structure. Further, the existing systems could not provide effective monitoring of the irrigation process and faults of the systems.

Currently, conventional methods and systems use multiple droppers. The droppers need filtration and acid-washing and regulation of discharge with respect to water permeation level in the soil. The droppers of the existing systems are inconvenient to use due to the clogging of pores, which affects the life of the root watering systems. However, the existing systems compute only water that required for the trees and shrubs but could not monitor total downstream network such as, rupture of tubes and blocked nozzles.

Therefore, there is a clear and present need for a smart root watering system includes adjustable vertical tubes so that the water supply can be set to the desired level into the soil. There is also a need for a smart root watering system for monitoring total irrigation network using a motion sensor for tracking faults of main water supply and input and output valves/nozzles. Further, there is also a need for a smart root watering system with improved anti-blocking ability, thereby reducing blocking issues of tubes and valves/nozzles.

SUMMARY OF THE INVENTION

One aspect of the present disclosure is directed to a smart root watering system, comprising: (a) a main board comprises a controller, wherein the controller is configured to control the smart root watering system; (b) one or more vertical tubes having holes inserted into the soil proximity to the roots of plants and trees, wherein the plurality of vertical tubes, comprising: (i) a filter configured to prevent soil and root to enter into the vertical tube; (ii) a motion sensor in communication with the controller, configured to detect variation in water flow and send data related to water flow to the controller via a wireless communication network, thereby indicating faults of the one or more vertical tubes to a user via a handheld electronic device; (c) at least one sensor device inserted into the soil proximity to at least any one of the vertical tube, wherein the sensor device in wirelessly communication with the controller, configured to detect the humidity level of soil and send data related to humidity level to the controller via the wireless communication network, thereby estimating required volume of required water using data related to humidity level from the sensor device using artificial neural networks and opening an electric valve by the controller for supplying water to roots of trees and plants via the vertical tubes.

In one embodiment, the sensor device is at least any one of a hygrometer, a humidity sensor, a temperature sensor, and a weather sensor. In another embodiment, the motion sensor of each vertical tube is further configured to connect in series to the controller via a wired connection, wherein the motion sensor is positioned at a top portion of the vertical tube. In one embodiment, the root watering system is further configured to remotely monitor via a software application installed in the handheld electronic device by the user. In one embodiment, the plurality of vertical tubes is of a mortise and tenon structure, thereby enabling a user to shorten and lengthen the plurality of vertical tubes. In one embodiment, the plurality of vertical tubes further comprises a mechanical valve with a floater for regulating input water to the root watering system with respect to the soil absorption.

In one embodiment, the plurality of vertical tubes further comprises an indicator, thereby directly indicating a fault of the root watering system to the user. In another embodiment, the controller is further configured to automatically identify the faults of the root watering system by analyzing the transmitted data from the sensor device and displacements of the floater within the vertical tube, thereby sending a notification to the handheld electronic device via the software application to alert the user. In one embodiment, the artificial neural network is configured to determine the time of displacement of the floater, the volume of required water, and soil humidity for the root watering system. In one embodiment, the handheld electronic device is at least any one of a smartphone, a tablet, a personal digital assistant (PDA), a laptop, and a cellular phone. In another embodiment, the wireless communication network is at least any one of Bluetooth®, Wi-Fi, WLAN, and radio waves.

Another aspect of the present disclosure is directed to a method for identifying faults in a smart root watering system, comprising: (a) transmitting data related to the displacement of a floater of each vertical tube with their specific IP to the controller via a wireless communication network after starting an irrigation process; (b) identifying faults of the vertical tubes via the controller based on the transmitted data related to displacements of the floater of each vertical tube and data from the motion sensor; (c) sending a notification to a handheld electronic device via a software application to alert the user using artificial neural networks. In one embodiment, the sensor device is at least any one of a hygrometer, a humidity sensor, a temperature sensor, and a weather sensor. In another embodiment, the plurality of vertical tubes further comprises a mechanical valve with the floater for regulating input water to the root watering system with respect to the soil absorption.

In one embodiment, the plurality of vertical tubes further comprises an indicator, thereby directly indicating a fault of the vertical tube of the root watering system to the user. In another embodiment, the motion sensor of each vertical tube is further configured to connect in series to the controller via a wired connection, wherein the motion sensor is positioned at a top portion of the vertical tube. In one embodiment, the artificial neural network is configured to determine the time of displacement of the floater, volume of feeding water, and soil humidity for the root watering system. In one embodiment, the plurality of vertical tubes is of a mortise and tenon structure, thereby shortening and lengthening the plurality of vertical tubes. In another embodiment, the handheld electronic device is at least any one of a smartphone, a tablet, a personal digital assistant (PDA), a laptop, and a cellular phone.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Figure 1:
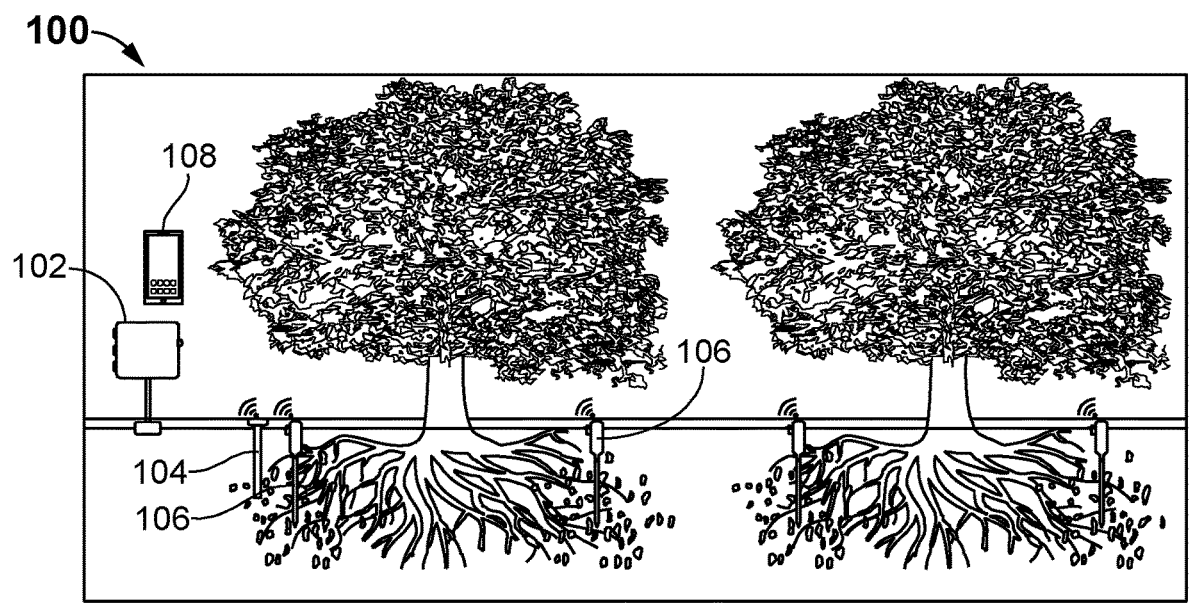
FIG. 1 illustrates a perspective view of a smart root watering system according to an embodiment of the present invention.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to a tree or plant watering system and more particularly relates to a smart root watering system for delivering water to the roots of trees, plants, and shrubs with a sensor device and for effective monitoring of any faults.

A smart root watering system for watering to the roots of trees and shrubs is disclosed. In one embodiment, the system comprises a main board with a controller. The controller is configured to control the operation of the root watering system. In one embodiment, the system further comprises one or more vertical tubes with a plurality of openings in each vertical tube. In one embodiment, the vertical tubes are inserted into the soil proximity to the roots of trees and configured to deliver water to the roots of plants and trees. In one embodiment, the vertical tubes further include a filter, securely positioned inside the vertical tubes. The filter is configured to prevent dirt, debris, and soil to enter into the vertical tubes.

In one embodiment, the vertical tubes further include a motion sensor. The motion sensor in communication with the controller, configured to detect variation in water flow and send data related to water flow to the controller via a wireless communication network, thereby indicating faults of the one or more vertical tubes to the user via a handheld electronic device. In one embodiment, the motion sensor could be positioned at, but not limited to, a top portion of the vertical tube. In another embodiment, the motion sensor incorporated with each vertical tube is further configured to connect in series to the controller via a wired connection. The system is further configured to remotely monitor via a software application installed in the handheld electronic device by a user.

In one embodiment, the plurality of vertical tubes is of a mortise and tenon structure, thereby enabling a user to shorten and lengthen the plurality of vertical tubes. In one embodiment, the vertical tube further includes a vessel with a mechanical valve and a floater. The mechanical valve with the floater is configured to regulate input water to the system with respect to the soil absorption. In one embodiment, the controller is further configured to automatically identify the faults of the root watering system by analyzing the transmitted data from the sensor device and displacements of the floater within the vertical tube, thereby sending a notification to the handheld electronic device via the software application to alert the user. In one embodiment, the handheld electronic device is at least any one of, but not limited to, a smartphone, a tablet, a personal digital assistant (PDA), a laptop, and a cellular phone. In another embodiment, the vertical tube further comprises an indicator, thereby directly indicating a fault of the system to the user. In one embodiment, the indicator is a transparent bubble.

In one embodiment, the system further comprises at least one sensor device, for example, a hygrometer. The sensor device is inserted into the soil proximity to at least any one of the vertical tube. The sensor device in wirelessly communication with the controller, configured to detect the humidity level of soil and send data related to humidity level to the controller via the wireless communication network. The controller further configured to estimate the required volume of water based on data related to the humidity level using artificial neural networks (ANNs) and open an electric valve for supplying water to the roots of plants and trees using the vertical tubes. The artificial neural network is configured to determine the time of displacement of the floater, volume of required water, and soil humidity for the root watering system.

In one embodiment, the sensor device is at least any one of, but not limited to, a hygrometer, a humidity sensor, a temperature sensor, and a weather sensor. In one embodiment, the wireless communication network is at least any one of, but not limited to, Bluetooth®, Wi-Fi, WLAN, and radio waves.

In one embodiment, a method for identifying faults in a smart root watering system using a motion sensor and artificial neural network is disclosed. At one step, data related to the displacement of a floater of each vertical tube with their specific IPs are transmitted to the controller via the wireless communication network after starting an irrigation process. At another step, the faults of the vertical tubes are identified by the controller based on the transmitted data related to the displacement of the floater of each vertical tube and data from the motion sensor of each vertical tube. Further, at another step, a notification is sent to the handheld electronic device, for example, a smartphone, via a software application to alert the user via artificial neural networks. In another embodiment, the user could directly monitor the vertical tubes of the system via an indicator. In one embodiment, the indicator is securely positioned at, but not limited to, a top portion of the vertical tube. The indicator could be, but not limited to, a transparent bubble.

Referring to FIG. 1, a smart root watering system 100 for watering the roots of trees and shrubs is disclosed. In one embodiment, the system 100 comprises a main board 102 with a controller 110 (shown in FIG. 5). The controller 110 is configured to control the operation of the root watering system 100. In one embodiment, the system 100 further comprises one or more vertical tubes 106. In one embodiment, the vertical tubes 106 are inserted into the soil proximity to the roots of trees and configured to deliver water the roots of plants and trees. In one embodiment, the vertical tube 106 further includes a filter, securely positioned within the vertical tube 106.

The filter is configured to prevent dirt, debris, root and soil to enter into the vertical tubes 106. In one embodiment, the one or more vertical tubes 106 further include a motion sensor. The motion sensor in communication with the controller 110, configured to detect variation in water flow and send data related to water flow to the controller 110 via a wireless communication network, thereby eliminating blockages of the holes of the plurality of vertical tubes 106. In one embodiment, the vertical tube 106 further includes a vessel/housing with a mechanical valve 132 and a floater 134.

In one embodiment, the system 100 further comprises at least one sensor device 104. In one embodiment, the sensor device 104 is inserted into the soil proximity to at least any one of the vertical tube 106. The sensor device 104 in communication with the controller 110, configured to detect the humidity level of soil and send data related to humidity level to the controller 110 via the wireless communication network, thereby estimating required volume of required water using data related to humidity level from the sensor device 104. The controller 110 further configured to open an electric valve for supplying water to the roots of the trees via the vertical tubes 106.

Initially, a user could select RWS devices such as vertical tubes 106 with a motion sensor 120 (shown in FIG. 8), based on wideness and depth of the roots of the trees or shrubs and connects each of the device to the IP system. In one embodiment, the vertical tubes 106 incorporated with a motion sensor 120 are connected to the controller 110 via a wired connection. In another embodiment, the devices such as vertical tubes 106 incorporated with a motion sensor 120 are connected to the controller 110 via a wireless communication network/protocol. In one embodiment, the controller 110 commands for irrigation process with respect to the transferred data from the sensor device 104, for example, a hygrometer, then water flows from the main water supply to the roots of the trees via the vertical tubes 106 through the electric valve and pipes.

Whereas velocity and volume of water input in the vertical tubes 106 are greater than water leakage in the soil so that the vertical tubes 106 are filled with water. The mechanical valve with the floater 134 prevents water to enter this area due to rise in water level. This mechanical valve may hinder the water flow with more than 3 bar pressure. The mechanical valve and the floater 134 could control the water flow or stream with respect to permeability of the soil.

The resulting data of the displacement of a floater 134 in each vertical tube 106 with their specific IPs are transmitted to the controller 110 after the irrigation process is started. If any vertical tube 106 indicates that the displacement of a floater 134 much less than the rest of vertical tubes 106 at watering startup point indicates a blockage issue at an entrance of the particular vertical tube 106, then the controller 110 sends a notification to the user via the handheld electronic device 108, for example, a smartphone, through the software application for alerting the user.

If the displacement of floater 134 from the initial point to the next point is beyond the acceptable mean variations of other floaters 134 and former log of the same floater 134, then the controller 110 identifies a rupture or crack in the vertical tube 106 and send a fault indication to the user via the handheld electronic device 108, for example, a smartphone, through the software application. If the rupture in the vertical tube 106 cause hindering of water flow to the main area of vertical tube 106, then the controller 110 automatically stops the irrigation process and warns the user.

If the floater 134 doesn't down after water feeding and at the end of irrigation, then the controller 110 indicates a blockage issue in the vertical tube 106 and send an alert to the user via the handheld electronic device 108, for example, a smartphone. If water scarcity occurs in the vertical tubes 106 during the time of irrigation process, then the controller 110 identifies a fault in the pump or the main water supply and send an alert to the user via the handheld electronic device 108, for example, a smartphone. If there is a lot of difference in data received from the artificial neural network and the sensor unit 104, then the controller 110 warns the user to checkup and calibrate the sensor device 104, for example, hygrometer sensor.

The floater 134 of vertical tubes 106 should move down after supplying water and at the end of irrigation. If each vertical tube 106 encounters any problem in supplying water to the ground inside the soil then the controller 110 reports to the user. Furthermore, at any time of irrigation process, if all devices of the system 100 are evacuated from water, then the controller 110 stops the irrigation process and sends a report to the user or farmer about a faulty pump or an issue in the main water supply.

Figure 2:
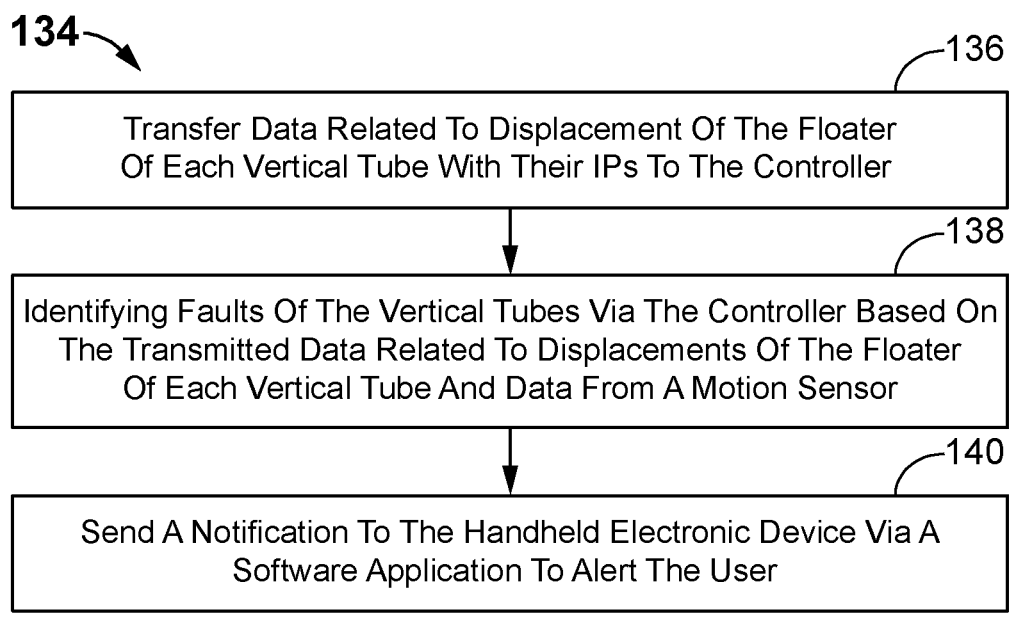
FIG. 2 shows a flowchart of a method for identifying faults of one or more vertical tubes of the smart root watering system according to one embodiment of the present invention.

Referring to FIG. 2, a method 134 for identifying faults in the system 100 (shown in FIG. 1) and alerts the user is disclosed. At step 136, data related to the displacement of a floater 134 of each vertical tube 106 (shown in FIG. 1) with their specific IPs are transmitted to the controller 110 (shown in FIG. 5) via the wireless communication network after starting an irrigation process. At step 138, the faults of the vertical tubes 106 are identified by the controller 110 based on the transmitted data related to the displacement of the floater 134 of each vertical tube 106. Further, at step 140, a notification is sent to the handheld electronic device 108 (shown in FIG. 1) via a software application to alert the user.

Figure 3:
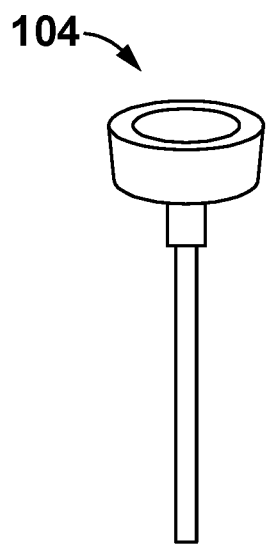
FIG. 3 shows a perspective view of a sensor device of the smart root watering system according to one embodiment of the present invention.

Referring to FIG. 3, the sensor device 104 of the system 100 is disclosed. In one embodiment, the sensor device 104 could be at least any one of, but not limited to, a hygrometer, a humidity sensor, a temperature sensor, and a weather sensor. In one embodiment, the sensor device 104 is configured to connect the controller 110 via a wireless communication network. The wireless communication network is at least any one of, but not limited to, Bluetooth®, Wi-Fi, WLAN, and radio waves. In another embodiment, the sensor device 104 is further configured to connect to the controller 110 via a wired connection.

Figure 4:
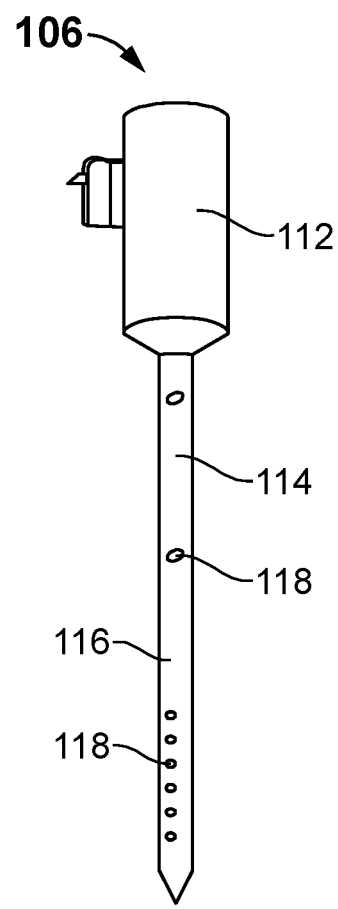
FIG. 4 illustrates a perspective view of the vertical tube of the smart root watering system according to one embodiment of the present invention.

Referring to FIG. 4, the vertical tube 106 of the system 100 is disclosed. In one embodiment, the vertical tube 106 comprises a top portion 112, a middle portion 114, and a lower portion 116. The middle portion 114 and the lower portion 116 of the vertical tube 106 further comprises a plurality of openings or holes 118. The number of plurality of openings 118 is at least, but not limited to, 30. In one embodiment, the plurality of openings 118 of each vertical tube 106 has a diameter of about, but not limited to, 0.5 mm. In one embodiment, the vertical tube 106 further includes an input nozzle. The input nozzle has a diameter of about, but not limited to, 4 mm. In one embodiment, a filter is positioned within each vertical tube 106 to prevent dirt, debris, and soil from entering into the vertical tube 106. In one embodiment, the vertical tube 106 further comprises, but not limited to, a motion sensor 120 (shown in FIG. 8). The motion sensor 120 is configured to detect the variation in water flow within the vertical tube 106. In one embodiment, the filter is further provided with coarse grids so that it prevents dirt, debris, root and soil from entering into the vertical tube 106. In one embodiment, the size and shape of the vertical tube 106 could be varied based on the requirement of the user.

Figure 5:
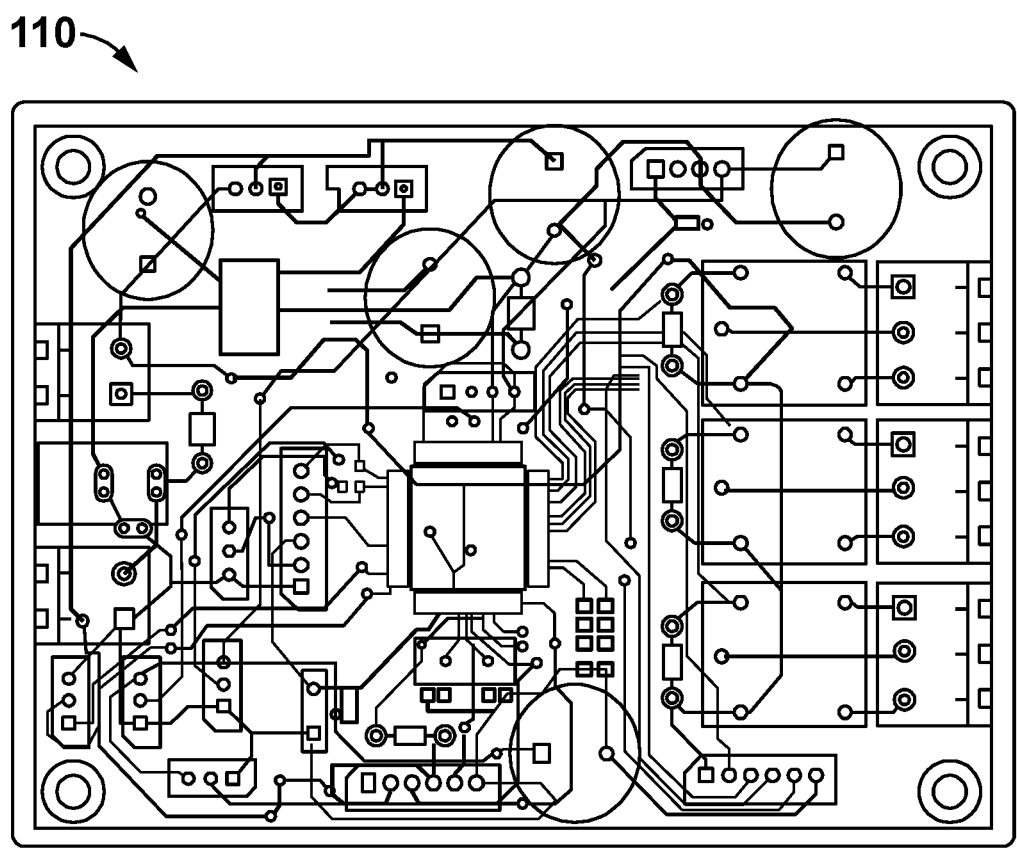
FIG. 5 shows a front view of a controller of the smart root watering system according to one embodiment of the present invention.

Referring to FIG. 5, the controller 110 of the system 100 is disclosed. In one embodiment, the controller 110 is configured to control the operation of the system 100 using artificial neural networks. The controller 110 comprises a plurality of conductive paths, provided with input and output connections. In one embodiment, a temperature sensor is connected to the input connection and the electric valve is connected to the output connection of the controller 100, respectively. In one embodiment, the controller 110 is further configured to automatically identify the faulty performance of the system 100 using artificial neural networks and analyzing the transmitted data from the motion sensor 120, thereby sending a notification to the handheld electronic device 108 via the software application to alert a user. The artificial neural network is configured to determine the time of displacement of the floater 134, the volume of required water, and the soil humidity for the system 100

In one embodiment, the controller 110 is securely positioned within the main board 102 of the system 100. The controller 110 is configured to wirelessly communicate to at least one handheld electronic device 108, for example, a smartphone via a wireless communication network. In one embodiment, the handheld electronic device 108 is at least any one of, but not limited to, a tablet, a personal digital assistant (PDA), a smartphone, a laptop, and a cellular phone. In one embodiment, the wireless communication network is at least any one of, but not limited to, Bluetooth®, Wi-Fi, WLAN, and radio waves.

Figure 6:
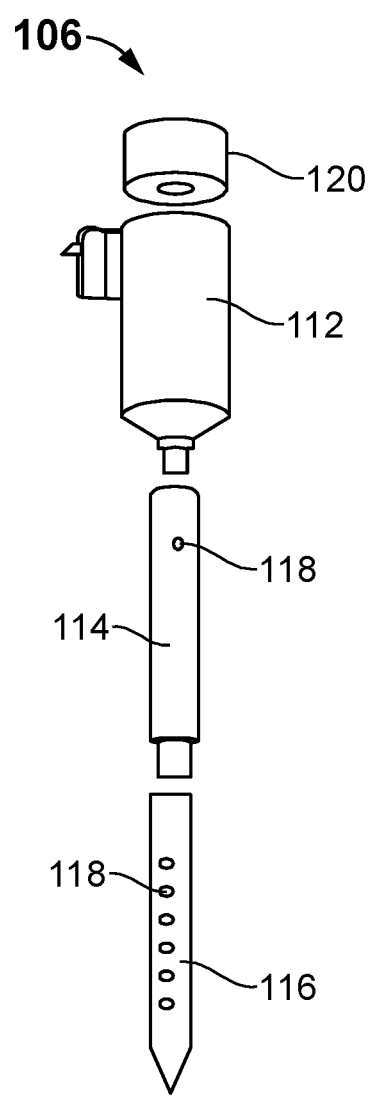
FIG. 6 shows an exploded view of the vertical tube according to one embodiment of the present invention.

Referring to FIG. 6, the vertical tube 106 of the system 100 is disclosed. One or more vertical tubes 106 are inserted into the soil proximity to the roots of trees or plants for supplying water. In one embodiment, one or more vertical tubes 106 incorporated with a motion sensor 120 are connected in series to the controller 110 of the system 100 via a wired connection. In another embodiment, one or more vertical tubes 106 incorporated with a motion sensor 120 are connected to the controller 110 of the system 100 via a wireless communication network/protocol. In one embodiment, the top portion 112 of the vertical tube 106 includes a motion sensor. The vertical tube 106 could be a pored tube. In one embodiment, the top portion 112, middle portion 114, and the lower portion 116 are configured to removably assembled to each other. In one embodiment, the vertical tube 106 is of a mortise and tenon structure, thereby enabling a user to shorten and lengthen the plurality of vertical tubes 106 based on the wide and depth of the roots of the trees and shrubs.

Figure 7A:
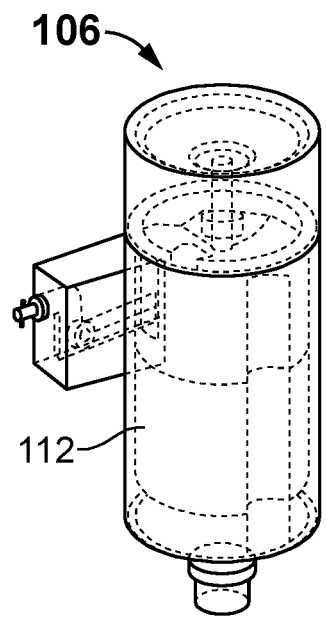
FIG. 7A illustrates a perspective view of a top portion of the vertical tube according to one embodiment of the present invention.
Figure 7B:
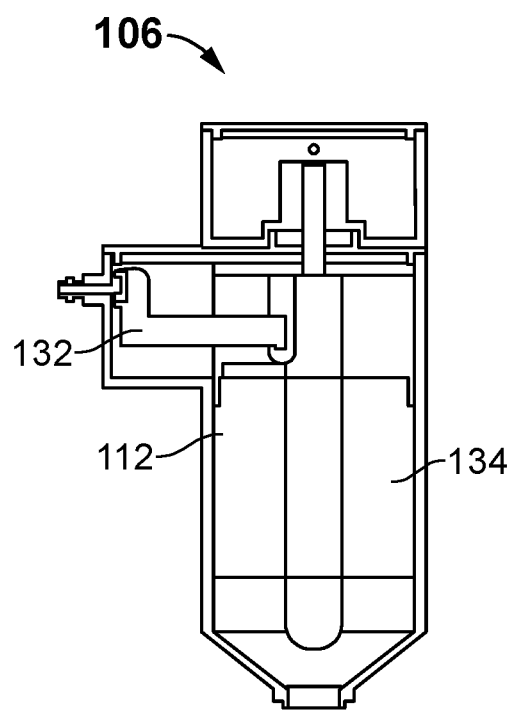
FIG. 7B shows a front view of the top portion of the vertical tube with a mechanical valve and floater according to one embodiment of the present invention.

Referring to FIGS. 7A-7B, the vertical tube 106 includes a vessel with a mechanical valve 132 and a floater 134 is disclosed. In one embodiment, the mechanical valve 132 and a floater 134 are configured to control input water flow or stream from entering into the vertical tube 106 with respect to permeability of the soil. Following to permeation of water in the soil, the floater 134 level goes lower and water enters into the vertical tube 106 and this cycle is continued as long as the irrigation process exists. In one embodiment, the displacements of the floater 134, equations governing over permeation speed versus primary humidity of the soil, and transferred data from the sensor device 104 are used to control the system 100 via the controller 110 using artificial neural networks (ANNs). In one embodiment, the controller 110 is further configured to automatically identify the faulty performance of the system 100 by analyzing the transmitted data from the sensor device 104 and displacements of the floater 134 within the vertical tube 106, thereby sending a notification to the handheld electronic device 108, for example, a smartphone, via the software application to alert the user.

The displacements of the floater 134, equations governing over permeation speed versus primary humidity of the soil, and transferred data from the sensor device 104 are used to find the relationship among time, the volume of required water, and humidity level using computational intelligence techniques, for example, artificial neural networks (ANNs). By training of this network in several irrigations, it may approximately estimate soil humidity using two parameters i.e., water penetration speed in mean values resulting from each of vertical tubes 106. The operations of the sensor device 104 and artificial neural network are compared and if there is a difference among both of these operations, then the controller 110 warns the user or farmer to checkup and calibrate the sensor device 104, for example, hygrometer sensor.

Figure 8:
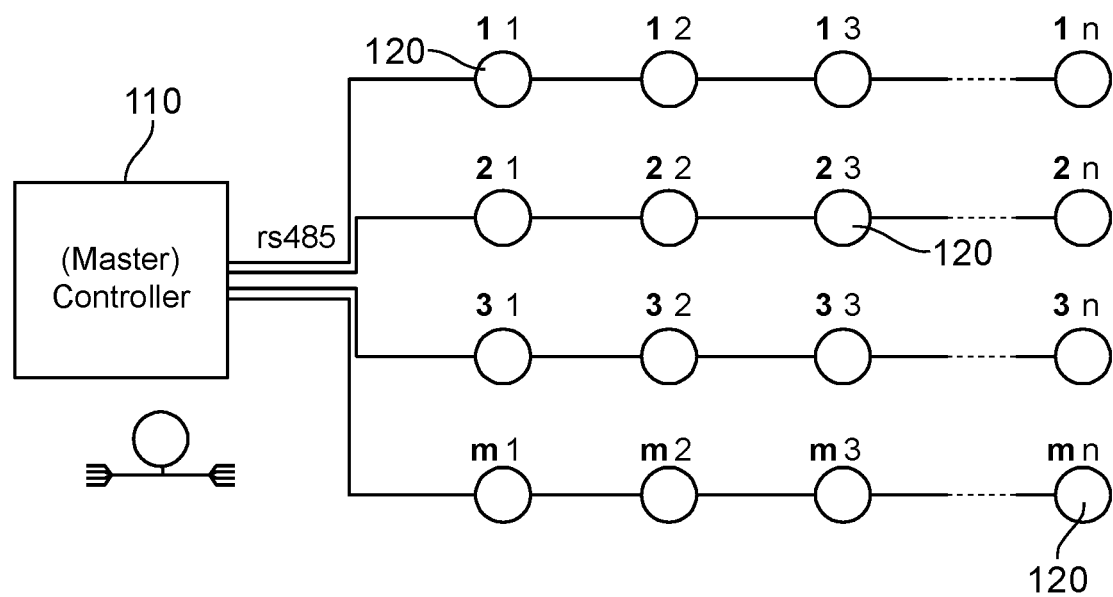
FIG. 8 shows a connection diagram of a plurality of motion sensors of the vertical tubes connected in series to the controller according to one embodiment of the present invention.

Referring to FIG. 8, the motion sensors 120 are connected to the controller 110 is disclosed. In one embodiment, the motion sensors 120 incorporated with the vertical tubes 106 are connected in series to the controller 110 via a wired connection. The user could securely connect $1n^{th}$ to $mn^{th}$ motion sensors in series to the controller 110 using the wired connection. The motion sensors 120 are configured to detect variation in water flow or stream and send data related to the variation in water flow to the controller 110. The controller 110 is further configured to detect a blockage issue within the vertical tube 106 and send an alert to the user via the handheld electronic device 108, for example, a smartphone, via the software application. In another embodiment, the motion sensor 120 of each vertical tube 106 is wirelessly connected to the controller 110 via a wireless communication network or protocol.

Figure 9:
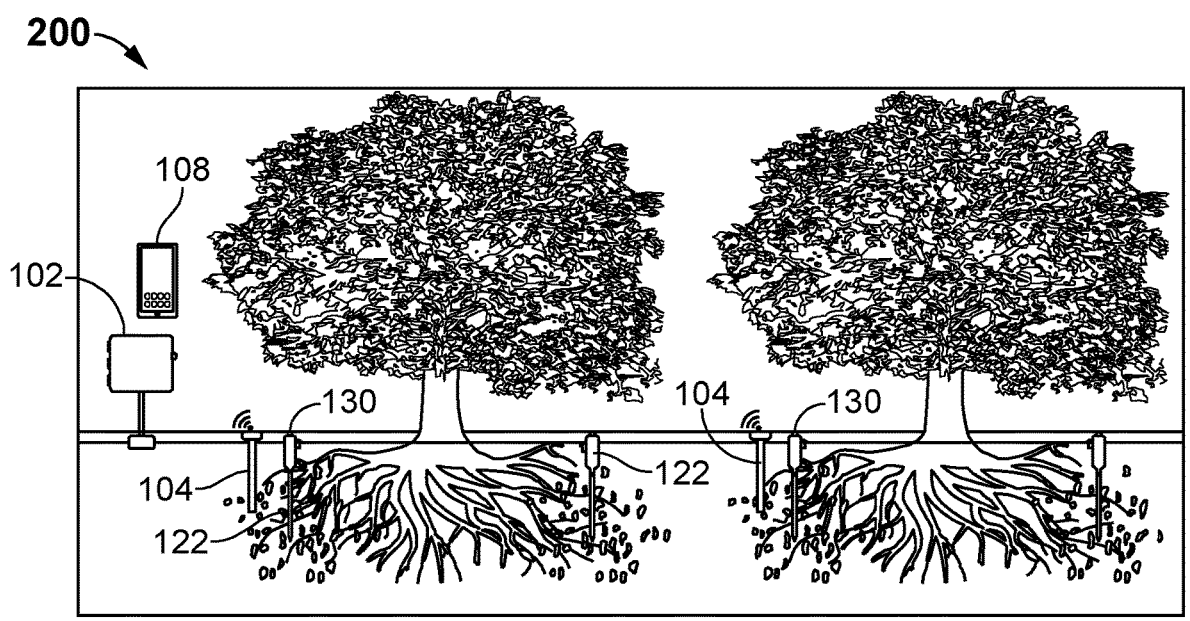
FIG. 9 illustrates a perspective view of a mechanical root watering system according to another embodiment of the present invention.

Referring to FIG. 9, a mechanical root watering system 200 for watering trees and shrubs is disclosed. In another embodiment, the system 200 comprises a main board 102 with a controller 110. The controller 110 is configured to control the operation of the system 200. In one embodiment, the system 200 further comprises one or more vertical tubes 122. In one embodiment, the vertical tubes 122 are inserted into the soil proximity to the roots of trees. The vertical tubes 122 are configured to deliver water to the roots of plants and trees. In one embodiment, the vertical tubes 122 further includes a filter 132 (shown in FIG. 10), securely positioned within the vertical tube 122. The filter 132 is configured to prevent dirt, debris, and soil to enter into the vertical tubes 122. In one embodiment, the vertical tube 122 further includes a vessel/housing with a mechanical valve 132 (shown in FIG. 12) and a floater 134 (shown in FIG. 12). Initially, a user could select RWS devices with one or more sensor devices 104, for example, hygrometer, based on wide and depth of the roots of trees or shrubs and connect each vertical tube 122 to the IP system.

In one embodiment, a method for identifying faults in the system 200 is disclosed. In another embodiment, the user could directly monitor the vertical tubes 122 via an indicator 130 (shown in FIGS. 10-11) of the vertical tubes 122 for identifying the faults. The system 200 uses one or more moisture sensors for estimating water content required for the roots of the tress.

Figure 10:
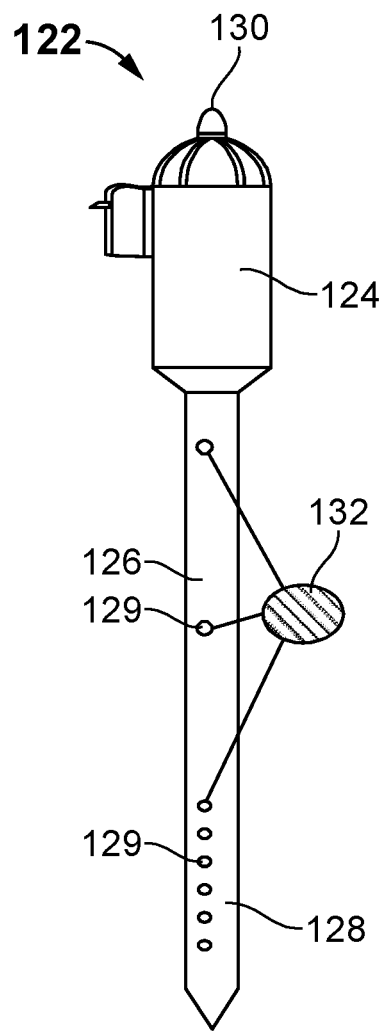
FIG. 10 shows a front view of the vertical tube of the mechanical root watering system according to another embodiment of the present invention.
Figure 11:
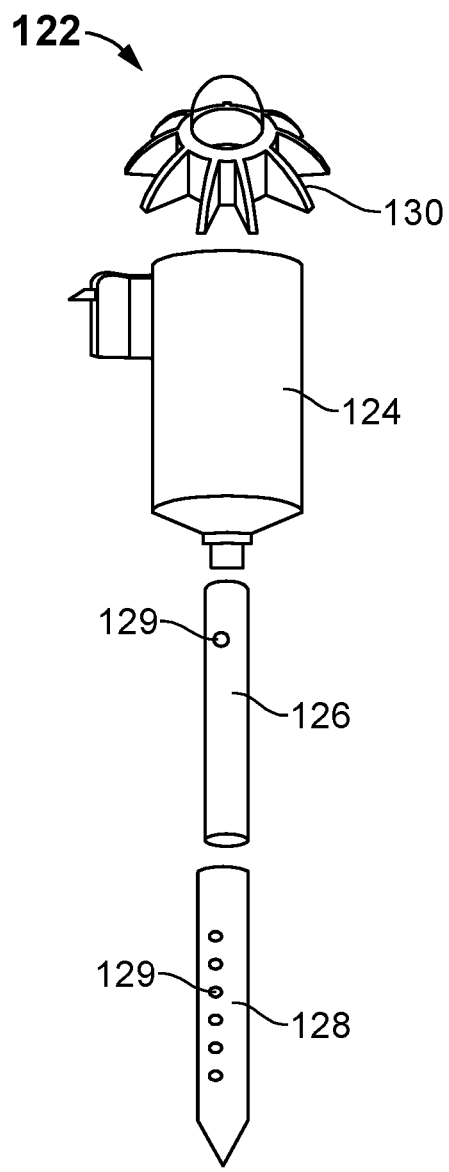
FIG. 11 illustrates an exploded view of the vertical tube of the mechanical root watering system according to another embodiment of the present invention.

Referring to FIGS. 10-11, the vertical tube 122 of the system 200 is disclosed. In one embodiment, vertical tube 122 comprises a top portion 124, a middle portion 126, and a lower portion 128. The top portion 124, a middle portion 126, and a lower portion 128 are removably connected to each other. In one embodiment, the middle portion 126 and the lower portion 128 comprises a plurality of openings 129. In one embodiment, the plurality of openings 129 of each vertical tube 122 has a diameter of about, but not limited to, 0.5 mm. In one embodiment, the vertical tube 122 further includes an input nozzle.

The input nozzle has a diameter of about, but not limited to, 4 mm. In one embodiment, the size and shape of the vertical tube 122 could be varied based on the requirement of the user. The vertical tube 122 further comprises an indicator 130, positioned on a top of the top portion 124 of the vertical tube 122. The indicator 130 is configured to indicate faults within the vertical tubes 122. The user directly checks the vertical tubes 122 of the system 200. In one embodiment, the indicator 130 could be, but not limited to, a transparent bubble.

Figure 12:
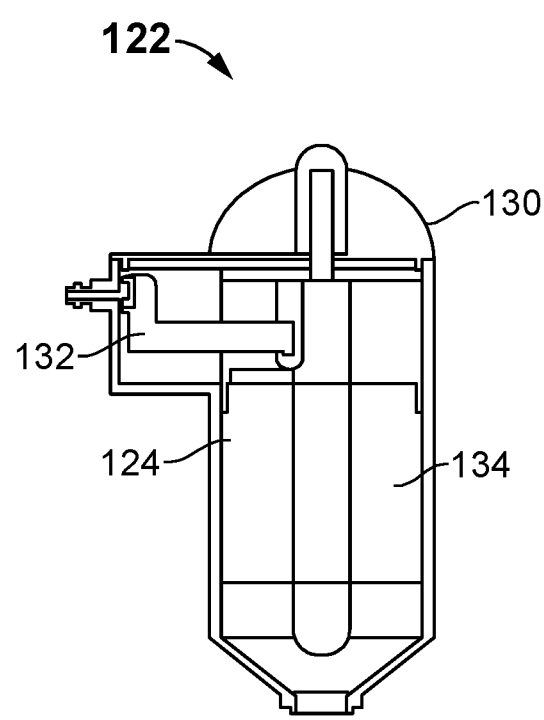
FIG. 12 illustrates a front view of the top portion of the vertical tube includes a mechanical valve and a floater according to another embodiment of the present invention.

Referring to FIG. 12, the top portion 124 of the vertical tube 122 of the system 200 is disclosed. In one embodiment, the top portion 124 of the vessel/housing of the vertical tube 122 includes a mechanical valve 132 and a floater 134. In one embodiment, the mechanical valve 132 and the floater 134 are configured to control input water flow or stream from entering into the vertical tube 122 with respect to permeability of the soil. Following to permeation of water in the soil, the floater 134 level goes lower and water enters into the vertical tube 122 and this cycle is continued as long as the irrigation process exists.

The advantages of the present invention include: the system 100 includes adjustable vertical tubes 106 so that the water supply could be set to the desired level into the soil. The user effectively and remotely monitors the irrigation network using the system 100. The artificial neural networks could analyse the data for monitoring the performance of the electric pump, pipelines, and input and output valves/nozzles and also effectively tracking faults of the system 100. Potential for calculation of soil humidity with high reliability using at least one sensor, for example, hygrometer.

The vertical tubes 106 include a filter to prevent blockages of openings 118, thereby extremely reducing blocking issues of vertical tubes 106 and valves or nozzles. The vertical tubes 106 of the system 100 could not require filtration and acid-washing and operation with both under-pressure and gravitational systems. The system 100 provides better water distribution for the roots of the trees and reduces water consumption. The system 100 is beneficial for deepening an effective soil layer and improves the soil fertility and the soil structure. The system 100 prevents soil from runoff and less limey soil. The controller 110 could improve the performance and durability of the system 100.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A smart root watering system, comprising:
   comprises a computer with a control program, wherein the computer is configured to control the smart root watering system;
   one or more vertical tubes having holes inserted into the soil proximate to the roots of plants and trees, wherein the plurality of vertical tubes, comprising:
   a filter configured to prevent soil and root to enter into the vertical tube;
   a motion sensor in communication with the computer, configured to detect variation in water flow and displacements of a floater within each vertical tube and send data related to water flow and displacements of the floater within each vertical tube to the computer via a wireless communication network, thereby indicating faults over time of the one or more vertical tubes to a user of a handheld electronic device via a software application to alert to the user;
   at least one sensor device inserted into the soil proximate to at least any one of the vertical tubes, wherein the sensor device in wirelessly communication with the computer, configured to detect the humidity level of soil and send data related to humidity level to the computer via the wireless communication network, thereby estimating required volume of required water using data related to humidity level from the sensor device and opening an electric valve by the computer for supplying water to roots of trees and plants via the vertical tubes.

2. The root watering system of claim 1, wherein the sensor device is at least any one of a hygrometer, a humidity sensor, a temperature sensor, and a weather sensor.

3. The root watering system of claim 1, wherein the motion sensor of each vertical tube is further configured to connect in series to the computer via a wired connection, wherein the motion sensor is positioned at a top portion of the vertical tube.

4. The root watering system of claim 1, is further configured to remotely monitor via a software application installed in the handheld electronic device by the user.

5. The root watering system of claim 1, wherein the plurality of vertical tubes is of a mortise and tenon structure, thereby enabling a user to shorten and lengthen the plurality of vertical tubes.

6. The root watering system of claim 1, wherein the plurality of vertical tubes further comprises a mechanical valve with a floater for regulating input water to the root watering system with respect to the soil absorption.

7. The root watering system of claim 1, wherein the plurality of vertical tubes further comprises an indicator, thereby directly indicating a fault of the root watering system to the user, wherein the indicator is a transparent bubble.

8. The root watering system of claim 1, wherein the computer is further configured to automatically identify the faults of the root watering system by analyzing the transmitted data from the sensor device and displacements of the floater within each of the vertical tubes, thereby sending a notification to the handheld electronic device via the software application to alert the user.

9. The root watering system of claim 1, wherein the wired or wireless communication network is configured to determine the time of displacement of the floater, the volume of required water, and soil humidity for the root watering system.

10. The root watering system of claim 1, wherein the handheld electronic device is at least any one of a smartphone, a tablet, a personal digital assistant (PDA), a laptop, and a cellular phone.

11. The root watering system of claim 1, wherein the wireless communication network is at least any one of Bluetooth®, Wi-Fi, WLAN, and radio waves.

12. A method for identifying faults in a smart root watering system, comprising:
wirelessly transmitting data related to variation in water flow and the displacement of a floater from a motion sensor within at least one vertical tube inserted into the soil proximate to the roots of plants and trees with their specific IP address to a computer with a control program via a wireless communication network after starting an irrigation process;
placing at least one sensor device inserted into the soil proximate to each of the vertical tubes;
identifying faults of the vertical tubes via the computer based on the wirelessly transmitted data related to displacements of the floater of each vertical tube and data from the motion sensor and
identifying the humidity level of soil data from the sensor device inserted into the soil and estimating required volume of required water using data related to humidity level from the sensor device and opening an electric valve by the computer for supplying water to roots of trees and plants via the vertical tubes; and
sending a notification to a handheld electronic device via a software application to alert the user using the wireless communication network.

13. The method of claim 12, wherein the sensor device is at least any one of a hygrometer, a humidity sensor, a temperature sensor, and a weather sensor.

14. The method of claim 12, wherein the plurality of vertical tubes further comprises a mechanical valve with the floater for regulating input water to the root watering system with respect to the soil absorption.

15. The method of claim 12, wherein the plurality of vertical tubes further comprises an indicator, thereby directly indicating a fault of the vertical tube of the root watering system to the user, wherein the indication is a transparent bubble.

16. The method of claim 12, wherein the motion sensor within each vertical tube is further configured to connect in series to the computer via a wired connection, wherein the motion sensor is positioned at a top portion of the vertical tube.

17. The method of claim 12, wherein the wireless communication network is configured to determine the time of displacement of the floater, volume of feeding water, and soil humidity for the root watering system.

18. The method of claim 12, wherein the plurality of vertical tubes is of a mortise and tenon structure, thereby shortening and lengthening the plurality of vertical tubes.

19. The method of claim 12, wherein the wireless communication network is at least any one of Bluetooth®, Wi-Fi, WLAN, and radio waves.

20. The method of claim 12, wherein the handheld electronic device is at least any one of a smartphone, a tablet, a personal digital assistant (PDA), a laptop, and a cellular phone.

* * * * *